No. 113,120. PATENTED MAR. 28, 1871.
W. B. WATKINS.
MEANS FOR DETECTING AND SIGNALING FIRES.
2 SHEETS—SHEET 1.
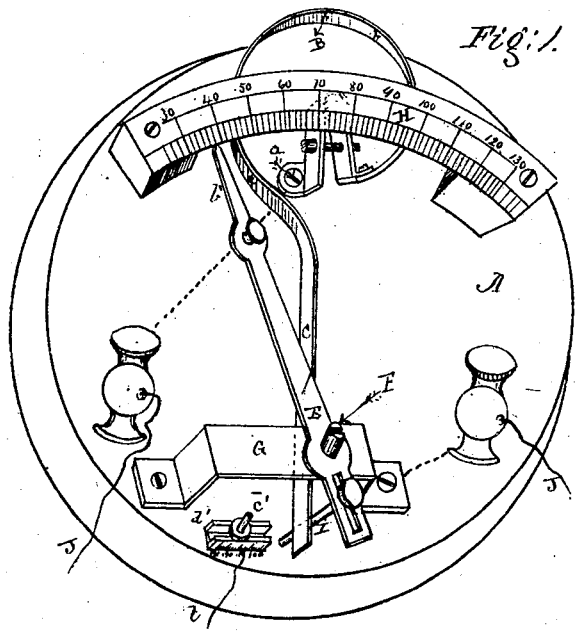
Fig. 1.
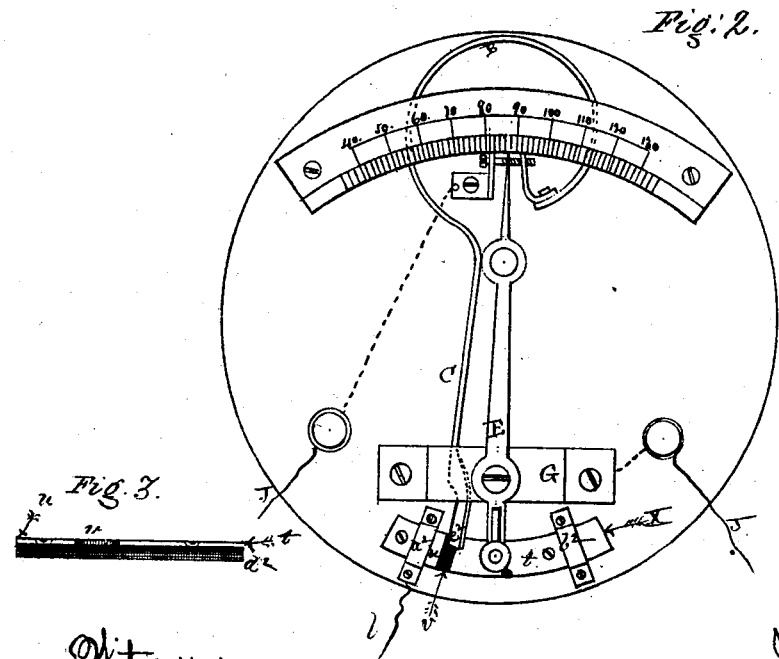
Fig. 2.
Fig. 3.
Witnesses:
Charles L. Barritt
Franklin Barritt
Inventor:
William B. Watkins No. 113,120. PATENTED MAR. 28, 1871.
W. B. WATKINS.
MEANS FOR DETECTING AND SIGNALING FIRES.
2 SHEETS—SHEET 2.
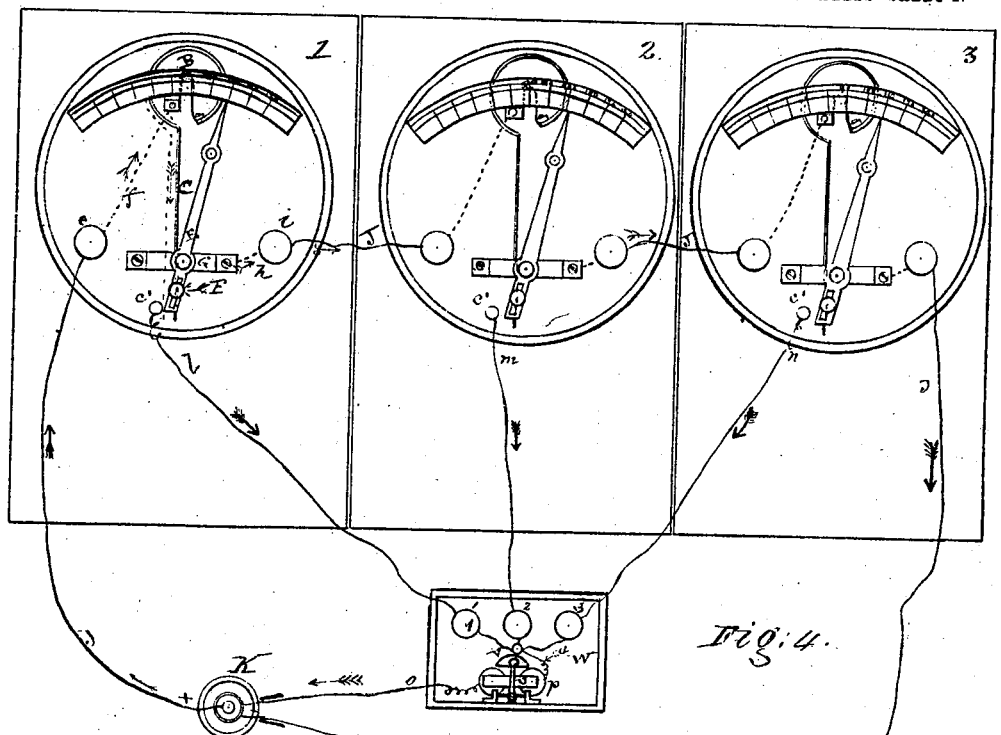
Fig. 4.
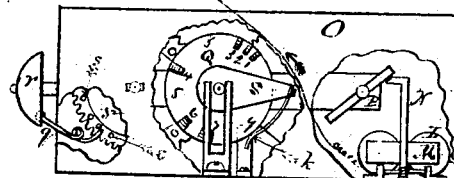
Witnesses
Charles T. Barritt
Franklin Barritt
Inventor
William B. Watkins
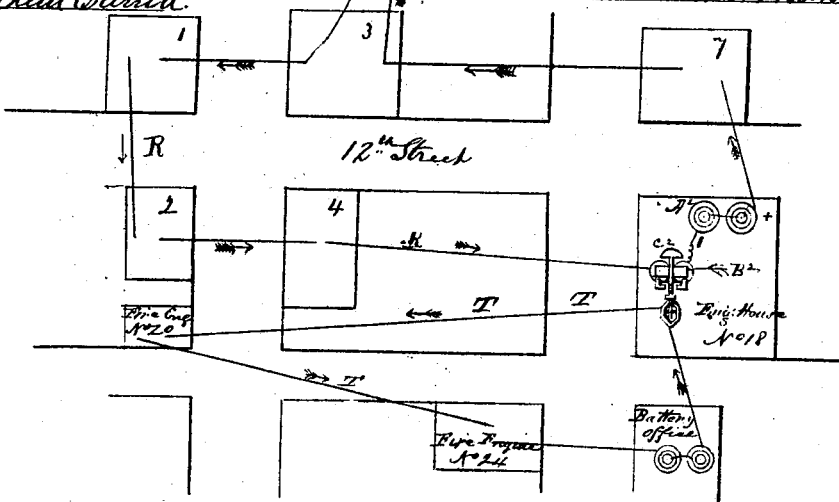

UNITED STATES PATENT OFFICE.

WILLIAM B. WATKINS, OF JERSEY CITY, NEW JERSEY.

IMPROVEMENT IN MEANS FOR DETECTING AND SIGNALING FIRES.

Specification forming part of Letters Patent No. 113,120, dated March 28, 1871.

*To all whom it may concern:*

Be it known that I, WILLIAM B. WATKINS, of Jersey City, county of Hudson and State of New Jersey, have invented certain Improvements in Means for Detecting Fires in Buildings, and for signaling their location, of which the following is a specification:

My invention under this patent is an improvement on my former Patents Nos. 111,412 and 111,413, in which heat-detectors are used to close an open electric circuit, to set in motion suitable mechanism to operate in different buildings, break circuits within the circuit of a main line or lines, so as to strike the number of the street and building thereon, or any desired signal at different points in the main line by means of the fire.

My improvement under this patent consists in combining with one or more main or fire-locating telegraph-lines connecting with buildings, and embracing mechanism and break-circuits operated thereby for opening and closing the fire-locating line, with a closed local circuit embracing heat-detecters arranged for breaking the local circuit, so as to signal at engine-houses, or at other points, the location of the buildings when fires occur, or when derangements of the local circuits occur therein.

The second part of my invention relates to constructing heat-detecters and combining them with a closed local circuit and an open local circuit in such a manner that when the closed circuit is broken by the effect of the heat an alarm will be sounded, and, at the same time, the open local circuit will be closed for the purpose of operating an indicator for indicating the exact room where the fire has occurred.

Figures 1 and 2, Sheet No. 1, represent different forms of heat-detecters arranged for opening a closed local circuit by an increase of temperature. Fig. 3 is a sectional view of part of the device shown in Fig. 2. Fig. 4, Sheet No. 2, represents a fire-locating telegraph-line connecting with several buildings and with a fire-engine house, showing the connections in one of the buildings with a break-circuit and mechanism for operating the same, arranged to be set in motion by means of heat-detecters placed in the different rooms for opening a closed local circuit upon an increase of temperature.

Figure 4 also represents an indicator, combined with an open local circuit arranged to be operated by heat-detecters upon an increase of temperature.

Upon a base-board, A, Fig. 1 is secured a compound strip, B, of two or more different metals, or other conducting materials, which expand or contract unequally by the effect of an increase or decrease of temperature.

The compound strip may be of any shape, either curved, straight, or spiral, and from the strip an arm, C, may extend, as shown in the drawings.

The strip is firmly secured at one end, $a$, so that the other end will oscillate to and fro by the changes in the temperature of the surrounding air.

In the instance shown, the compound strip consists of a strip of brass, $b$, and a strip of steel, $c$, secured together. The brass being upon the inside of the curve, and the steel upon the outside, an increase of temperature will expand the brass more than the steel, which will cause the steel to draw the free end or arm C toward the left, or toward the side upon which the steel is fastened.

An index-arm, E, is also secured to the base-board A, and works tightly upon a screw or fulcrum, F, which is secured to a metallic support, G.

This arm is arranged so as to be set at any desired degree of temperature by means of the thermometer-scale H, toward which the end $b'$ of the arm E points.

To the other end of the index arm is secured a metallic pin or screw, I, which is arranged in such a manner that when the arm E is turned and set at any degree above the temperature of the room, it will force back the compound strip, or the arm C extending therefrom, to a point to which it will be moved by the effect of the heat, when it has reached the degree indicated by the index-arm, and until the temperature is raised to the degree indicated the compound strip will spring against the index-arm, and both will remain in contact with each other. Upon the base-board A is also secured an adjustable pin, $c'$, which can be fastened at any point in the slot of the metallic frame $d'$, or other metallic support which may be arranged for the purpose. The use of the adjustable metallic pin will be hereafter more fully described.

The spaces 1 2 3, Fig. 4, Sheet No. 2, represent rooms in a building with heat-detecters arranged therein, as described, for breaking the local circuit J by an increase of temperature. This local circuit or line J runs in the direction of the arrows from the positive (+) pole of the battery K to the screw-post e upon the heat-detecter in room No. 1, and connects by the wire f, shown by the dotted lines, with the compound strip B. The circuit is completed through the compound strip B, arm C, pin 1, index-arm E, support G, wire h, and screw-post i, from which the line J runs, and connects in a similar manner with the heat-detecters in rooms Nos. 2 and 3, embracing in its circuit the coils of a magnet, L, from which the line runs to the other pole of the battery.

The index-arms upon the heat-detecters in all the rooms having been set at any degree above the ordinary temperature of the room at which it may be desired to give an alarm in case of fire, the compound strips and the index-arms will be in contact, the local circuit will be closed, and the electric current passing through the coils of the magnet L will cause it to operate the armature M and lever N attached thereto, so as to hold a train of wheels, O, wound up by means of the lever N and fly P, or any detent which may be arranged for the purpose.

The object of the train of wheels, which may be carried by the force of a spring or by a weight, is to operate a break-circuit, Q, for the purpose of sounding or signaling the number of the building and the number of the street, or any desired signal, through the fire-locating line R, or through a series of fire-alarm circuits connected therewith, so as to locate the fire immediately upon its commencement. The line R runs in the direction of the arrows from one pole of the battery $A^2$, and enters buildings Nos. 7, 3, 1, 2, and 4, and connects with break-circuits in each building, as shown in building No. 3, and returns to the battery, through the coils of the magnet $B^2$, for operating the electro-magnetic gong-bell $C^2$ in the engine-house No. 18, for sounding the desired signal therein.

The break-circuit for the purpose of opening and closing the line R, for giving the desired signal, may be of any suitable construction. It may consist of a wheel having pins upon it at intervals, corresponding with the signal or number to be sounded, and the pins, as the wheel is revolved by the train, may be made to operate a key embraced in the fire-locating line R at the same intervals; or a revolving wheel, having non-conductors inserted in it or notches cut in it at proper intervals to open and close the line, so as to sound the desired signal, may be carried by the train; or, as in the instance shown, an arm, S, may be fastened to one of the shafts of the train, which, when the train is released, will cause the arm to revolve around a stationary disk or break-circuit, Q, arranged with breaks upon it at intervals corresponding to the number of the street and the number of the building, which, in the instance shown, is building No. 3 in 12th street. The number of the building is represented by the breaks 1 2 3 at short intervals, and the number of the street is represented by the break 4, metallic interval 5, and breaks 6 and 7, at longer intervals.

The metallic interval 8 separates the building from the street-number, and the long metallic interval 9 separates the beginning and ending of the series. When the end k of the arm S passes over the breaks it will open and close the circuit of the fire-locating line R at the desired intervals.

As the operation of break-circuits for the purpose has been more fully described in Letters Patent heretofore granted to the subscriber, further description here is deemed unnecessary, except to state that when the train is released the break-circuit arranged for the purpose will be operated, or the arm S will revolve around the break-plate or disk Q until the train is arrested or has run down, and during each revolution of the arm the signal will be sounded at the desired points through the fire-locating line R and through a system of lines or fire-alarm circuits, T, which may be operated by the line R, as is more fully described in the patents above referred to.

Now, upon the commencement of a fire in either of the rooms 1 2 3, when the temperature has reached a point above that at which the index-arm has been set the compound strip B, or the arm C extending therefrom, will be drawn away from the index-arm E and against the adjustable metallic pin $c'$, as shown by the dotted lines in Fig. 4, room No. 1. The closed local circuit J will now be broken, the armature M and the train will be released, and the break-circuit will be operated thereby, as described. A local alarm may also be sounded by means of the hammer q, which may be operated by the pins S arranged for that purpose upon one of the wheels $J^2$ of the train, so that the bell r may be struck when the end of the hammer is tripped by the pins as the wheel revolves.

When the location of the building in which the fire has occurred has been signaled at the engine-houses or other desired points through the line R or other main lines connecting therewith by the effect of the fire itself in breaking the closed local circuit, as described, and the firemen have reached the building, they may at once be directed to the exact room in which the fire has occurred by means of an indicator or annunciator, W, which connects with the different rooms. The wires l, m, and n, for this purpose run from the adjustable metallic pin or screw $c'$ upon the heat-detecter in each room and lead to the indicator, and all the wires may terminate in a single wire, o, which runs to the battery K through the coils of the magnet p.

It will be seen that the closed local circuit J having been broken the battery K may now be used to work either of the open circuits which run through the indicator, and part of the line J may also be used to form the open circuit. This open circuit will be automatically closed in each room whenever the compound strip B or arm C is brought in contact with the metallic pin c' by means of the heat, which will occur whenever the closed local circuit J is broken by the same means.

The indicator or annunciator may be of any suitable construction. The wire leading from the heat-detecter in each room may embrace in its circuit the coils of an electro-magnet upon the indicator for operating an armature, vibrating lever, and number attached thereto, which corresponds with the number of the room, so as to move the number up or down when the electric circuit is closed or broken through the coils of the magnet, thus forming a self-adjusting indicator, or the circuit from each room may be completed through a key upon the indicator numbered to correspond with the number of the room, so that when the keys are tested, and one is found which will operate the electro-magnetic sounder U or bell V connected therewith, it will be known that the fire has commenced in the room which corresponds with the number of the key.

Now, it will be evident that the same signal or alarm will be sounded through the line R and system of lines connecting therewith when the closed local circuit J is broken from any other cause than that of fire. If an incendiary or an occupant maliciously cuts the wires of the local circuit in the building, thinking thereby to prevent the alarm which an incendiary fire would cause, the same alarm would be instantly sounded, or if the local circuit should be broken by accident, or if the battery of the local line should be neglected and should run down, in either case the armature M and the train would be released, and the same alarm would be given.

It will thus be seen that when a closed local fire-detecting circuit is used in buildings, derangements, when they occur in the local line, will give instant notice at the desired points, so that the derangements may be repaired, and the constant working condition of the local circuit insured.

When the heat-detecter or fire-alarm is applied to steamers or vessels, another advantage of its use, when arranged in the manner described, so that the local circuit will be kept constantly closed by the pressing of the compound strip or arm C extending therefrom against the index-arm, is to prevent false alarms, which might otherwise occur, by means of the series of vibrations of the compound strip which would be caused by the sudden jars to vessels which are of frequent occurrence during storms at sea.

It will be evident that other devices can be used instead of that shown in Fig. 1, Sheet 1, to carry out my manner of working a fire-locating line, R, or a system of fire-alarm circuits, as described, by means of breaking a closed local circuit in buildings by the effect of heat. I, therefore, do not confine myself to the device described.

Fig. 2, Sheet No. 1, represents another form of device for the purpose.

The index-arm E is fastened at one end to a sliding bar, X, which consists of plates of metal, $t$ and $u$, secured to a non-conducting support, $d^2$, and separated from each other by the non-conducting space $v$, shown more clearly in Fig. 3. The index-arm E and plate $t$ are in metallic connection with each other. The end $e^2$ of the arm C is in contact with the sliding bar, and moves upon it to and fro, as the compound strip B is affected by the changes in the temperature. The bar X slides under the metallic strips $a^2$ and $b^2$, when the arm E is moved backward and forward, to be set at different points upon the thermometer-scale H, by which means the bar may also be adjusted, so that the end $e^2$ of the arm C may be brought upon the non-conducting space $v$ at any desired degree of temperature.

Now, when the compound strip and the index-arm are connected with the poles of a battery, the circuit of the line J will be closed when the end $e^2$ of the compound strip is in contact with the plate $t$; but when the heat has acted upon the compound strip so as to separate the end $e^2$ from the plate $t$, or so as to bring the end $e^2$ upon the non-conducting space $v$, the circuit of the line J will be broken, by which means the line R may be operated as described.

At the same instant that the end $e^2$ leaves the plate $t$ it comes in contact with the plate $u$, and closes the open circuit for operating the indicator W, the line $l$ for this purpose being connected with the metallic strip $a^2$, which is in metallic connection with the plate 26. It will thus be seen that the closed local circuit J can be broken by the agency of heat, so as to operate the fire-locating line R, as described, when any device embraced in the local line J is so arranged that any two metallic points in contact, through which the closed local circuit is completed, will be drawn away, the one from the other, or be automatically separated at any increased degree of heat.

The frame of the slot $d^1$, Fig. 1, may be divided into degrees, as shown, so that the metallic pin $c^1$ may be set at any desired degree for closing the local open circuit at any temperature.

A closed circuit, by itself, having been used to spring an alarm within the circuit, I therefore do not claim the same.

Having described my invention, I claim—

1. In a fire detecting and locating system, the combination of one or more main or fire-locating lines, R, embracing break-circuits in buildings, with closed local circuits J, and heat-detecters, arranged therein, for breaking said closed circuits upon an increase of temperature, and suitable mechanism, brought into operation thereby, for operating the break-circuits of the main line or lines R, so as to strike the number of the building and that of the street, or any desired signal, at different points through the main line or lines connecting therewith, as described.

2. The combination of heat-detecters with a closed local circuit, J, with its alarm mechanism, and with an open local circuit, or a series of open local circuits, connecting with an open indicator or annunciator, W, both circuits operated by the same heat-detecter, for the purpose described.

3. The combination of the compound strips B, index-arm E, thermometer-scale H, adjustable pin I, and circuits J J, when said parts are so arranged that the circuit will remain closed below any predetermined degree of temperature, but will be broken, and thereby cause an alarm, when the temperature increases, as described.

4. The combination and arrangement of the compound strip B, index-arm E, thermometer-scale H, and adjustable metallic pin $e'$, or its equivalent, for the purpose described.

In testimony whereof I have hereunto signed my name.

WILLIAM B. WATKINS.

Witnesses:
RICHD. L. H. FINCH,
E. M. SMITH.